United States Patent
Inoue et al.

(10) Patent No.: US 11,811,069 B2
(45) Date of Patent: Nov. 7, 2023

(54) CATALYST FOR AIR ELECTRODE, AIR ELECTRODE INCLUDING CATALYST FOR AIR ELECTRODE, AND AIR SECONDARY BATTERY INCLUDING AIR ELECTRODE

(71) Applicant: FDK CORPORATION, Tokyo (JP)

(72) Inventors: Minori Inoue, Tokyo (JP); Takeshi Kajiwara, Tokyo (JP); Shohei Unoki, Tokyo (JP); Takahiro Endo, Tokyo (JP); Shigekazu Yasuoka, Tokyo (JP); Yoshikatsu Watanabe, Nishiokitama-gun (JP)

(73) Assignee: FDK CORPORATION, Tokyo (JP)

( * ) Notice: Subject to any disclaimer, the term of this patent is extended or adjusted under 35 U.S.C. 154(b) by 0 days.

(21) Appl. No.: 17/660,194

(22) Filed: Apr. 21, 2022

(65) Prior Publication Data
US 2022/0359884 A1  Nov. 10, 2022

(30) Foreign Application Priority Data
May 7, 2021  (JP) .................................. 2021-078890

(51) Int. Cl.
*H01M 4/86* (2006.01)
*H01M 10/26* (2006.01)
*H01M 4/90* (2006.01)
*H01M 4/02* (2006.01)

(52) U.S. Cl.
CPC ....... *H01M 4/8615* (2013.01); *H01M 4/9016* (2013.01); *H01M 4/9075* (2013.01); *H01M 10/26* (2013.01); *H01M 2004/027* (2013.01); *H01M 2004/8689* (2013.01); *H01M 2300/0014* (2013.01)

(58) Field of Classification Search
CPC ............... H01M 4/925; H01M 8/1004; H01M 2004/8689; H01M 2008/1095; H01M 4/921; H01M 4/926; H01M 8/1018; Y02E 60/50
See application file for complete search history.

(56) References Cited

FOREIGN PATENT DOCUMENTS

| CN | 113412155 | * | 9/2021 | ............ B01J 23/656 |
| JP | 6444205 B2 | | 12/2018 | |

* cited by examiner

*Primary Examiner* — Helen Oi K Conley
(74) *Attorney, Agent, or Firm* — Kinney & Lange, P.A.

(57) ABSTRACT

A battery includes: an electrode group including an air electrode and a negative electrode that are stacked with a separator interposed therebetween; and a container housing the electrode group together with an alkaline electrolyte liquid. The air electrode includes a catalyst for an air electrode. This catalyst for an air electrode is a catalyst for an air electrode including an oxide containing at least bismuth (Bi), ruthenium (Ru), sodium (Na), and oxygen, and Na/(Ru+Bi+Na) representing an atomic ratio of the sodium to a sum of the bismuth, the ruthenium, and the sodium is 0.126 or more and 0.145 or less.

4 Claims, 1 Drawing Sheet

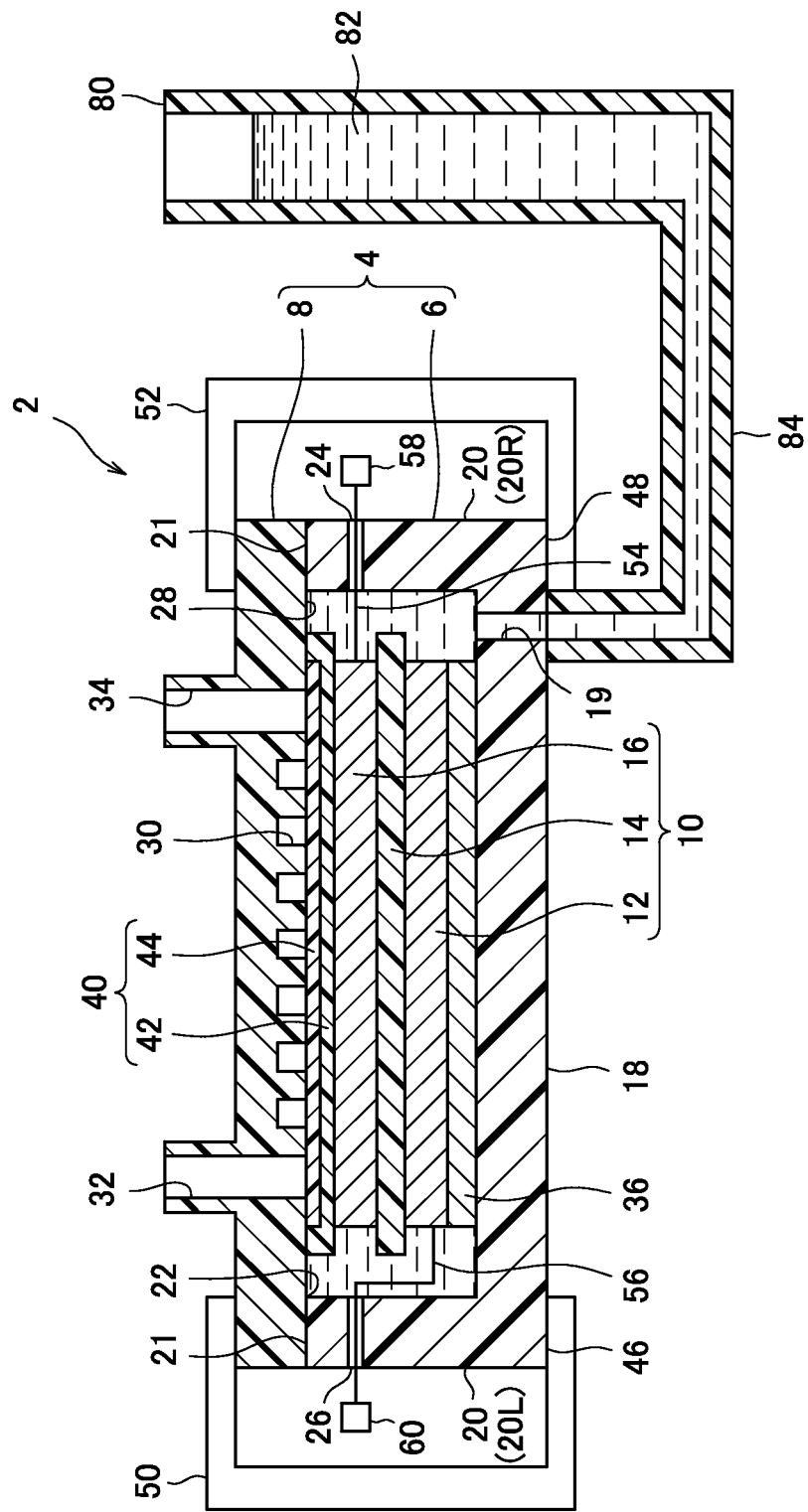

CATALYST FOR AIR ELECTRODE, AIR ELECTRODE INCLUDING CATALYST FOR AIR ELECTRODE, AND AIR SECONDARY BATTERY INCLUDING AIR ELECTRODE

CROSS-REFERENCE TO RELATED APPLICATION(S)

This application claims priority to Japanese Application No. 2021-078890 filed on May 7, 2021, which is incorporated herein by reference in its entirety.

BACKGROUND

Technical Field

The present disclosure relates to a catalyst for an air electrode, an air electrode including this catalyst for an air electrode, and an air secondary battery including this air electrode.

Description of the Related Art

In recent years, an air battery using oxygen in the atmosphere as a positive electrode active material has attracted attention because of its high energy density, easiness of downsizing and weight-saving. In such an air battery, a zinc-air primary battery is practically used as a power source for a hearing aid.

In addition, an air secondary battery using Li, Zn, Al, Mg, and the like for a negative electrode metal is being investigated as a chargeable air battery, and such an air secondary battery is promising as a novel secondary battery that may exceed an energy density of a lithium-ion secondary battery.

As a kind of such an air secondary battery, known is an air-hydrogen secondary battery using an alkaline aqueous solution for an electrolyte liquid (hereinafter, also referred to as an alkaline electrolyte liquid) and hydrogen for a negative electrode active material (see Japanese Patent No. 6444205, for example). Although an air-hydrogen secondary battery represented by one in Japanese Patent No. 6444205 uses a hydrogen-storage alloy as a negative electrode metal, the negative electrode active material in the air-hydrogen secondary battery is hydrogen that is stored and released with the above hydrogen-storage alloy, and thereby dissolution and precipitation reactions of the hydrogen-storage alloy itself do not occur with a chemical reaction during charge and discharge of the battery (hereinafter, also referred to as a battery reaction). Therefore, the air-hydrogen secondary battery has merits of free from problems such as occurrence of an internal short circuit due to a dendric precipitation of the negative electrode metal, so-called a dendrite growth and lowering of a battery capacity due to a change in shape.

In the air secondary battery using the alkaline electrolyte liquid, such as the above air-hydrogen secondary battery, the following charge and discharge reactions occur in a positive electrode (hereinafter, also referred to as an air electrode).

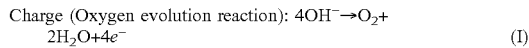

Charge (Oxygen evolution reaction): $4OH^- \rightarrow O_2 + 2H_2O + 4e^-$ (I)

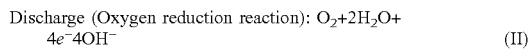

Discharge (Oxygen reduction reaction): $O_2 + 2H_2O + 4e^- \rightarrow 4OH^-$ (II)

As shown in the reaction formula (I), the air secondary battery generates oxygen in the air electrode during charge. This oxygen passes through a space inside the air electrode to be released to the atmosphere through a part in the air electrode opened to the atmosphere. On the other hand, during discharge, oxygen that is taken in from the atmosphere is reduced as shown in the reaction formula (II) to generate hydroxide ion.

For the air electrode which is a positive electrode of the above air secondary battery, a catalyst that accelerates the above charge and discharge reactions is used. The air secondary battery is desired to have reduced overvoltage in the charge and discharge reactions in the air electrode in order to improve the energy efficiency and increase the output. Thus, regarding a material for the catalyst used for the air electrode, a material effective for reducing the overvoltage is investigated. As such a material effective for reducing the overvoltage, various metal oxides are promising. Among such metal oxides, a pyrochlore bismuth-ruthenium composite oxide is considered to be particularly effective as the catalyst for the air electrode because it has "dual function" of oxygen reduction and oxygen evolution, and it can reduce the overvoltage in both of the charge reaction and the discharge reaction.

The air secondary battery, which is promising for application to various usage, is desired to have further increased output. To further increase the output, particularly a discharge voltage is required to be higher.

SUMMARY

An aspect of the present invention is directed to a catalyst for an air electrode, comprising an oxide containing at least bismuth, ruthenium, sodium, and oxygen, wherein Na/(Ru+Bi+Na) representing an atomic ratio of the sodium to a sum of the bismuth, the ruthenium, and the sodium is 0.126 or more and 0.145 or less.

BRIEF DESCRIPTION OF THE DRAWINGS

The present disclosure will become more fully understood from the detailed description given hereinafter and the accompanying drawings which are given by way of illustration only, and thus, are not limitative of the present disclosure, and wherein:

FIG. 1 is a sectional view schematically illustrating an air-hydrogen secondary battery according to an embodiment.

DETAILED DESCRIPTION

An air-hydrogen secondary battery (hereinafter, also referred to as a battery) 2 including an air electrode catalyst for an air secondary battery according to an embodiment will be described below with reference to the drawing.

As illustrated in FIG. 1, the battery 2 includes a container 4 and an electrode group 10 housed in the container 4 together with an alkaline electrolyte liquid 82.

The electrode group 10 is formed by stacking a negative electrode 12 and an air electrode (positive electrode) 16 with a separator 14 interposed therebetween.

The negative electrode 12 includes: a negative electrode substrate having a porous structure, many pores, and conductivity; and a negative electrode mixture supported in the above pores and on a surface of the negative electrode substrate. For the above negative electrode substrate, a nickel foam can be used, for example.

The negative electrode mixture contains: a hydrogen-storage alloy powder that is an aggregate of hydrogen-storage alloy particles capable of storing and releasing hydrogen as a negative electrode active material; a conductive material; and a binder. For the conductive material, a graphite powder that is an aggregate of graphite particles, a carbon black powder that is an aggregate of carbon black particles, and the like can be used.

As a hydrogen-storage alloy constituting the hydrogen-storage alloy particles, for example, a rare earth metal-Mg—Ni based hydrogen-storage alloy is preferably used, but not particularly limited thereto. The composition of this rare earth metal-Mg—Ni based hydrogen-storage alloy is freely selected, and for example, an alloy represented by the following general formula is preferably used.

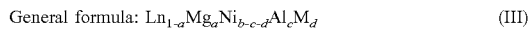

General formula: $Ln_{1-a}Mg_aNi_{b-c-d}Al_cM_d$ (III)

In the general formula (III), Ln represents at least one element selected from the group consisting of La, Ce, Pr, Nd, Pm, Sm, Eu, Gd, Tb, Dy, Ho, Er, Tm, Yb, Lu, Sc, Y, Zr, and Ti; M represents at least one element selected from the group consisting of V, Nb, Ta, Cr, Mo, Mn, Fe, Co, Ga, Zn, Sn, In, Cu, Si, P, and B; and the subscripts a, b, c, and d represent numbers satisfying relationships of $0.01 \le a \le 0.30$, $2.8 \le b \le 3.9$, $0.05 \le c \le 0.30$, and $0 \le d \le 0.50$, respectively.

The hydrogen-storage alloy particles may be obtained, for example, as follows.

First, metal raw materials are weighed to be a predetermined composition, and mixed. This mixture is melted under an inert gas atmosphere in, for example, a high-frequency induction melting furnace, and then cooled to form an ingot. The obtained ingot is heated under an inert gas atmosphere to 900 to 1200° C., and subjected to a heat treatment by holding the temperature for 5 to 24 hours to be homogenized. Thereafter, the ingot is crashed and sieved to obtain the hydrogen-storage alloy powder that is the aggregate of the hydrogen-storage alloy particles having a desired particle diameter.

For the binder, sodium polyacrylate, carboxymethyl cellulose, styrene-butadiene rubber, and the like are used, for example.

The negative electrode 12 may be manufactured, for example, as follows.

First, the hydrogen-storage alloy powder that is the aggregate of the hydrogen-storage alloy particles, the conductive material, the binder, and water are kneaded to prepare a negative electrode mixture paste. The obtained negative electrode mixture paste is added into the negative electrode substrate, and then subjected to a drying treatment. After the drying, the negative electrode substrate on which the hydrogen-storage alloy particles and the like are adhered is rolled for increasing an amount of alloy per unit volume, and then cut to obtain the negative electrode 12. This negative electrode 12 has a plate shape as an entirety. Since a negative electrode mixture layer included in the negative electrode 12 is formed with the hydrogen-storage alloy particles, the conductive material particles, and the like, there is space between the particles to form the porous structure as an entirety.

The air electrode 16 includes: an air electrode substrate having a mesh structure and conductivity; and an air electrode mixture layer (positive electrode mixture layer) formed with an air electrode mixture (positive electrode mixture) supported on the above air electrode substrate. For the above air electrode substrate, a nickel mesh can be used, for example.

The air electrode mixture includes an oxidation-reduction catalyst (catalyst for the air electrode), a conductive material, and a binder.

As the oxidation-reduction catalyst, a catalyst having the dual function of oxidation and reduction is used. Such a catalyst having the dual function contributes to reduction of the overvoltage of the battery during both of the charge process and the discharge process. As such an oxidation-reduction catalyst, for example, a pyrochlore bismuth-ruthenium composite oxide is used. This bismuth-ruthenium composite oxide has the dual function of oxygen generation and oxygen reduction.

The bismuth-ruthenium composite oxide in the present embodiment contains at least bismuth, ruthenium, sodium, and oxygen. In addition, Na/(Ru+Bi+Na) representing an atomic ratio of sodium to the sum of bismuth, ruthenium, and sodium is 0.126 or more and 0.145 or less.

The present inventor made intensive investigation of improvement in a catalytic activity of the catalyst for the air electrode, and found that sodium contained in the bismuth-ruthenium composite oxide affects on the catalytic activity. The present inventor considered that the improvement in the catalytic activity improves performances of the air secondary battery, and more specifically investigated a relationship between a discharge voltage and sodium in the air secondary battery. As a result, the inventor has found a relationship between an amount of sodium contained in the bismuth-ruthenium composite oxide and the discharge voltage, and has found that setting Na/(Ru+Bi+Na) representing an atomic ratio of sodium to the sum of bismuth, ruthenium, and sodium in the bismuth-ruthenium composite oxide to be 0.126 or more yields a remarkable improving effect of the discharge voltage. In this investigation process, it has been confirmed that an aspect of Na/(Ru+Bi+Na) being up to 0.145 yields the improving effect of the discharge voltage.

The above pyrochlore bismuth-ruthenium composite oxide can be manufactured, for example, as follows.

$Bi(NO_3)_3 \cdot 5H_2O$ and $RuCl_3 \cdot 3H_2O$ are prepared. Then, each of $Bi(NO_3)_3 \cdot 5H_2O$ and $RuCl_3 \cdot 3H_2O$ is weighed to be a predetermined amount. $Bi(NO_3)_3 \cdot 5H_2O$ and $RuCl_3 \cdot 3H_2O$ are preferably weighed so that Bi is 0.780 or more and 0.815 or less at an atomic ratio based on 1.000 of Ru.

Next, the weighed $Bi(NO_3)_3 \cdot 5H_2O$ and $RuCl_3 \cdot 3H_2O$ are added to distilled water, and stirred to prepare a mixed aqueous solution of $Bi(NO_3)_3 \cdot 5H_2O$ and $RuCl_3 \cdot 3H_2O$. In this time, a temperature of the distilled water is 60° C. or higher and 90° C. or lower. Then, a 1 mol/L or more and 3 mol/L or less aqueous NaOH solution is added to this mixed aqueous solution to precipitate a precursor. After the precursor precipitates, the mixed aqueous solution is stirred. This stirring procedure is performed for 12 hours to 48 hours with an oxygen bubbling. In the mixed aqueous solution during the stirring procedure, a pH is maintained to be 11, and a temperature is maintained to be 60° C. or higher and 90° C. or lower. After the stirring procedure, the mixed aqueous solution is left to stand for 12 hours to 48 hours. After the standing, the generated precipitate is suction-filtered to be recovered. The recovered precipitate is maintained at 80° C. or higher and 100° C. or lower for evaporating a part of moisture to form a paste. This paste is transferred to an evaporating dish, heated to 100° C. or higher and 150° C. or lower, and maintained at this state for 1 hour or longer and 5 hours or shorter for drying to obtain a dried paste. The obtained dried paste is put on a mortar, grinded with a pestle to obtain a powder. Then, this powder is subjected to a calcining treatment by heating under an air atmosphere to a temperature of 400° C. or higher and 700° C. or lower and by maintaining for 0.5 hours or longer and 4 hours or shorter. The powder after the calcining treatment is washed by using distilled water at 60° C. or higher and 90° C. or lower, and then subjected to a drying treatment. This procedure yields the pyrochlore bismuth-ruthenium composite oxide. This bismuth-ruthenium composite oxide is represented by $Bi_{2-x}Ru_2O_{7-z}$ (x satisfies a relationship of $0 \leq x \leq 1$ and z satisfies a relationship of $0 \leq z \leq 1$), and a part of Bi is substituted with Na. This Na is mainly derived from the aqueous NaOH solution used in the above catalyst manufacturing process.

Next, the obtained bismuth-ruthenium composite oxide is preferably subjected to an acid treatment by immersing in an aqueous nitric acid solution. A specific procedure is as follows.

First, an aqueous nitric acid solution is prepared. A concentration of the aqueous nitric acid solution is preferably 5 mol/L or less. The concentration is more preferably 2 mol/L or less. The aqueous nitric acid solution is preferably prepared so that the amount thereof is a proportion of 20 mL per 1 g of the bismuth-ruthenium composite oxide. A temperature of the aqueous nitric acid solution is preferably set to 20° C. or higher.

Then, the bismuth-ruthenium composite oxide is immersed in the prepared aqueous nitric acid solution, and stirred for 1 hour or longer and 6 hours or shorter. After a predetermined time passes, the bismuth-ruthenium composite oxide in the aqueous nitric acid solution is suction-filtered. The filtered bismuth-ruthenium composite oxide is washed with distilled water set at 60° C. or higher and 80° C. or lower.

The washed bismuth-ruthenium composite oxide is maintained under an environment at 100° C. or higher and 130° C. or lower for 1 hour or longer and 4 hours or shorter to be subjected to a drying treatment.

The above procedure yields an acid-treated bismuth-ruthenium composite oxide. Such an acid treatment can remove a byproduct generated in the manufacturing process of the bismuth-ruthenium composite oxide. The acidic aqueous solution used for the acid treatment is not limited to the aqueous nitric acid solution, and an aqueous hydrochloric acid solution and an aqueous sulfuric acid solution can be used other than the aqueous nitric acid solution. These aqueous hydrochloric acid solution and aqueous sulfuric acid solution can also yield the effect of removing the byproduct similar to the aqueous nitric acid solution.

The above procedure yields the bismuth-ruthenium composite oxide powder that is the aggregate of the bismuth-ruthenium composite oxide particles and in which the byproduct is removed.

Next, the conductive material will be described. The conductive material is used for reducing an internal resistance to increase the output of the air secondary battery, and as the support of the above oxidation-reduction catalyst.

For such a conductive material, for example, a nickel powder composed of nickel particles is preferably used. An average particle diameter of the above nickel particles is not particularly limited, and preferably a size capable of imparting a desired conductivity to the air electrode.

The above nickel powder is preferably contained at 60 mass % or more in the air electrode mixture. An upper limit of the content of this nickel powder is preferably 80 mass % or less in relation to other component materials in the air electrode mixture.

The binder acts to bind the component materials of the air electrode mixture and to impart an appropriate water repellency to the air electrode 16. The binder is not particularly limited, and for example, a fluororesin is used. As a preferable fluororesin, polytetrafluoroethylene (hereinafter, also referred to as PTFE) is used, for example.

The air electrode 16 can be manufactured, for example, as follows.

First, a catalyst powder that is an aggregate of the bismuth-ruthenium composite oxide particles, the conductive material powder that is an aggregate of Ni particles as the conductive material, the binder, and water are prepared. Then, these catalyst powder, conductive material powder, binder, and water are kneaded to prepare an air electrode mixture paste.

The obtained air electrode mixture paste is formed in a sheet shape by, for example, roller pressing to obtain an air electrode mixture sheet. Then, the air electrode mixture sheet is crimping-pressed on the nickel mesh (air electrode substrate) to obtain an intermediate product of the air electrode.

Next, the obtained intermediate product is fed into a calcining treatment furnace to perform a calcining treatment. This calcining treatment is performed in an inert gas atmosphere. As this inert gas, nitrogen gas or argon gas is used, for example. As a condition of the calcining treatment, the intermediate product is heated to 200° C. or higher and 400° C. or lower to maintain this state for 10 minutes or longer and 40 minutes or shorter. Then, the intermediate product is allowed to be cooled in the calcining treatment furnace, and taken out into the atmosphere when the temperature of the intermediate product becomes 150° C. or lower. This procedure yields a calcining-treated intermediate product. This calcining-treated intermediate product is cut to a predetermined shape to obtain the air electrode 16. This air electrode 16 includes an air electrode mixture layer formed with the air electrode mixture. Since the air electrode mixture contains the bismuth-ruthenium composite oxide particles and the like, the air electrode mixture layer formed with such an air electrode mixture has a porous structure including many pores as an entirety, and has an excellent gas diffusivity.

The air electrode 16 and the negative electrode 12, obtained by the above procedures, are stacked with the separator 14 interposed therebetween to form the electrode group 10. This separator 14 is disposed to prevent a short circuit between the air electrode 16 and the negative electrode 12, and an insulative material is used for the separator 14. As the material used for the separator 14, a non-woven fabric made of a polyamide fabric on which a hydrophilic functional group is provided, a non-woven fabric made of a polyolefin fabric such as polyethylene and polypropylene on which a hydrophilic functional group is provided, and the like can be used, for example.

The formed electrode group 10 is housed in the container 4 together with the alkaline electrolyte liquid. This container 4 is not particularly limited as long as it can house the electrode group 10 and the alkaline electrolyte liquid, and for example, an acrylic box-shaped container 4 is used. This container 4 includes, for example, a container body 6 and a lid 8, as illustrated in FIG. 1.

The container body 6 has the box shape having a bottom wall 18 and a side wall 20 extending upward from a periphery edge part of the bottom wall 18. A part of the side wall 20 surrounded by an upper end edge 21 is opened. That is, an opening part 22 is provided on the opposite side of the bottom wall 18. On the side wall 20, each through hole is provided on predetermined positions on a right side wall 20R and a left side wall 20L, and these through holes become draw-out apertures 24 and 26 for lead wires, described later.

On the container body 6, an electrolyte liquid storage part 80 is further attached. This electrolyte liquid storage part 80 is a container housing the alkaline electrolyte liquid 82, and attached with, for example, a linking part 84 communicated with a through hole 19 provided on the bottom wall 18. The linking part 84 is a passage of the alkaline electrolyte liquid 82, and communicated between the inside of the container 4 and the electrolyte liquid storage part 80. Since the inside of the container 4 and the electrolyte liquid storage part 80 are communicated with each other, as above, the alkaline electrolyte liquid 82 can move between the inside of the container 4 and the electrolyte liquid storage part 80.

The lid 8 has a plan-viewed shape same as the plan-viewed shape of the container body 6, and covers an upper part of the container body 6 to close the opening part 22. The lid 8 and the upper end edge 21 of the side wall 20 are liquid-tightly sealed.

On the lid 8, a ventilation duct 30 is provided on an inner face part 28 facing the inside of the container body 6. The ventilation duct 30 has an opened part facing the inside of the container body 6, and has one serpentine shape as an entirety. Furthermore, an inlet ventilation hole 32 and an outlet ventilation hole 34 that penetrate in the thickness direction are provided on predetermined positions of the lid 8. The inlet ventilation hole 32 is communicated with one end of the ventilation duct 30, and the outlet ventilation hole 34 is communicated with the other end of the ventilation duct 30. That is, the ventilation duct 30 is opened to the atmosphere through the inlet ventilation hole 32 and the outlet ventilation hole 34. On the inlet ventilation hole 32, a pressure pump, not illustrated, is preferably attached. Driving this pressure pump can feed air into the ventilation duct 30 through the inlet ventilation hole 32.

On the bottom wall 18 of the container body 6, an adjuster 36 is disposed, if necessary. The adjuster 36 is used for positioning in the height direction of the electrode group 10 in the container 4. For the adjuster 36, a nickel foam sheet is used, for example.

The electrode group 10 is disposed on the adjuster 36. In this time, the negative electrode 12 of the electrode group 10 is disposed so as to contact with the adjuster 36.

Meanwhile, a water-repellent ventilation member 40 is disposed on the air electrode 16 side of the electrode group 10 so as to contact with the air electrode 16. This water-repellent ventilation member 40 is a combined material of a PTFE porous film 42 and a non-woven fabric diffusing paper 44. The water-repellent ventilation member 40 has a water repelling effect with PTFE, and allows gas to pass therethrough. The water-repellent ventilation member 40 is interposed between the lid 8 and the air electrode 16, and tightly attached to both of the lid 8 and the air electrode 16. This water-repellent ventilation member 40 is large for covering an entirety of the ventilation duct 30, inlet ventilation hole 32, and outlet ventilation hole 34 of the lid 8.

The above container body 6 housing the electrode group 10, the adjuster 36, and the water-repellent ventilation member 40 is covered with the lid 8. As schematically illustrated in FIG. 1, the periphery edge parts 46 and 48 of the container 4 (the container body 6 and the lid 8) are sandwiched from upper and lower sides with couplers 50 and 52. Then, a predetermined amount of the alkaline electrolyte liquid 82 is injected through the electrolyte liquid storage part 80 to fill the container 4 with the alkaline electrolyte liquid 82. This procedure forms the battery 2.

As the above alkaline electrolyte liquid 82, a common alkaline electrolyte liquid used for an alkali secondary battery is preferably used, and specifically, an aqueous solution containing at least one of NaOH, KOH, and LiOH as a solute is used.

In the battery 2, the ventilation duct 30 of the lid 8 is opposite to the water-repellent ventilation member 40. Since the water-repellent ventilation member 40 allows gas to pass but blocks moisture, the air electrode 16 is opened to the atmosphere through the water-repellent ventilation member 40, the ventilation duct 30, the inlet ventilation hole 32, and the outlet ventilation hole 34. That is, the air electrode 16 contacts with the atmosphere through the water-repellent ventilation member 40.

In this battery 2, an air electrode lead (positive electrode lead) 54 is electrically connected to the air electrode (positive electrode) 16, and a negative electrode lead 56 is electrically connected to the negative electrode 12. These air electrode lead 54 and negative electrode lead 56, which are schematically illustrated in FIG. 1, are drawn out through draw-out apertures 24 and 26 to the outside of container 4 with keeping the gas tightness and liquid tightness. An air electrode terminal (positive electrode terminal) 58 is provided at a tip of the air electrode lead 54, and a negative electrode terminal 60 is provided at a tip of the negative electrode lead 56. Therefore, the battery 2 inputs and outputs current during charge and discharge using these air electrode terminal 58 and negative electrode terminal 60.

EXAMPLES

1. Manufacture of Battery

Example 1

(1) Synthesis of Catalyst for Air Electrode
1) Coprecipitation Step $Bi(NO_3)_3 \cdot 5H_2O$ and $RuCl_3 \cdot 3H_2O$ were prepared. Each of $Bi(NO_3)_3 \cdot 5H_2O$ and $RuCl_3 \cdot 3H_2O$ was weighed so that a content of Bi was 14.2 atom %, a content of Ru was 17.4 atom %, and Bi was 0.815 at an atomic ratio based on 1.000 of Ru. Both of the weighed $Bi(NO_3)_3 \cdot 5H_2O$ and $RuCl_3 \cdot 3H_2O$ were added into distilled water at 70° C. and stirred to prepare a mixed aqueous solution of $Bi(NO_3)_3 \cdot 5H_2O$ and $RuCl_3 \cdot 3H_2O$. Two liters of the distilled water was prepared. Then, into the obtained mixed aqueous solution, a 2 mol/L aqueous NaOH solution was gradually added to precipitate a precursor. After this precursor precipitated, the mixed aqueous solution was stirred. This stirring procedure was performed for 24 hours with an oxygen bubbling. During this stirring procedure, a pH of the mixed aqueous solution was maintained at 11, and a temperature thereof was maintained at 70° C. After the stirring procedure, the mixed aqueous solution was left to stand for 24 hours. After the standing, the generated precipitate was suction-filtered to be recovered. The recovered precipitate was maintained at 85° C. for evaporating a part of moisture to form a paste. The obtained paste was transferred to an evaporating dish, heated to 120° C., and subjected to a drying treatment by maintaining this state for 3 hours to obtain a dried precursor.

2) Calcining Step

The obtained dried precursor was put on a mortar, grinded with a pestle to obtain a powder. The obtained precursor powder was subjected to a calcining treatment by heating at 500° C. under an air atmosphere and maintaining this state for 3 hours. The precursor after the calcining treatment was washed by using distilled water at 70° C., suction-filtered, and subjected to drying treatment by holding 120° C. for 3 hours. The above procedure yielded a bismuth-ruthenium composite oxide (catalyst for an air electrode).

3) Acid-Treating Step

The bismuth-ruthenium composite oxide was added into a stirrer-equipped stirring vessel together with an aqueous nitric acid solution, and the aqueous nitric acid solution was maintained at 25° C. with stirring for 1 hour to be subjected to an acid treatment. In this time, an amount of the aqueous nitric acid solution was a proportion of 20 mL per 1 g of the bismuth-ruthenium composite oxide powder. A concentration of the aqueous nitric acid solution was 2 mol/L.

After the stirring, the bismuth-ruthenium composite oxide powder in the aqueous nitric acid solution was suction-filtered to be recovered. The recovered bismuth-ruthenium composite oxide powder was washed with distilled water heated to 70° C. After the washing, the bismuth-ruthenium composite oxide powder was dried by maintaining under an atmosphere at 120° C. for 3 hours.

The above procedure yielded an acid-treated bismuth-ruthenium composite oxide powder, that is, a powder of a catalyst for an air electrode.

(2) Manufacture of Air Electrode

A Ni powder that was an aggregate of Ni particles was prepared. These Ni particles formed a filament-shape, and an average particle diameter was 10 to 20 μm.

In addition, a polytetrafluoroethylene (PTFE) dispersion and ion-exchanged water were prepared.

Into the powder of the bismuth-ruthenium composite oxide (catalyst for the air electrode) obtained as above, the nickel powder, the polytetrafluoroethylene (PTFE) dispersion, and the ion-exchanged water were added to be mixed. In this time, 20 parts by weight of the bismuth-ruthenium composite oxide powder, 70 parts by weight of the nickel powder, 10 parts by weight of the PTFE dispersion, and 10 parts by weight of the ion-exchanged water were uniformly mixed at this ratio to manufacture an air electrode mixture paste.

The obtained air electrode mixture paste was formed into a sheet shape, and dried by maintaining under a room temperature environment at 25° C. to obtain an air electrode mixture sheet. The obtained air electrode mixture sheet was crimping-pressed on a nickel mesh with a number of mesh of 60, a wire diameter of 0.08 mm, and an opening ratio of 60%. The above procedure yielded an intermediate product of the air electrode.

Next, the intermediate product of the air electrode was subjected to a calcining treatment. A condition of the calcining treatment was heating the intermediate product of the air electrode under a nitrogen gas atmosphere at a calcining temperature of 340° C., and holding this temperature for 13 minutes. The calcining-treated intermediate product was cut to 40 mm in length and 40 mm in width to obtain an air electrode 16. A thickness of this air electrode 16 was 0.23 mm. In the obtained air electrode 16, an amount of the bismuth-ruthenium composite oxide powder (catalyst for the air electrode) was 0.24 g.

(3) Manufacture of Negative Electrode

Each metal material of Nd, Mg, Ni, and Al was mixed to be a predetermined molar ratio, then fed into a high-frequency induction melting furnace to melt under an argon gas atmosphere, the obtained molten metal was poured into a mold, and cooled to a room temperature at 25° C. to manufacture an ingot.

Then, this ingot was subjected to a heat treatment by holding a temperature of 1000° C. under an argon gas atmosphere for 10 hours, and then cooled to a room temperature at 25° C. After the cooling, the ingot was mechanically crashed under an argon gas atmosphere to obtain a rare earth metal-Mg—Ni based hydrogen-storage alloy powder. On the obtained rare earth metal-Mg—Ni based hydrogen-storage alloy powder, a mean volume diameter (MV) was measured by a laser diffraction/scattering-type particle size distribution measuring device. As a result, the mean volume diameter (MV) was 60 μm.

A composition of this hydrogen-storage alloy powder was analyzed by a high-frequency inductively coupled plasma atomic emission spectroscopy (ICP-AES), and the composition was $Nd_{0.89}Mg_{0.11}Ni_{3.33}Al_{0.17}$.

An electrochemical alloy capacity of the obtained hydrogen-storage alloy was measured. Specifically, a separated measurement sample, which was a part of the hydrogen-storage alloy powder obtained as above, and a nickel powder were prepared. Then, 0.25 g of the hydrogen-storage alloy powder as the measurement sample and 0.75 g of the nickel powder were mixed to prepare a mixed powder, and the mixed powder was mold-formed to produce a circular pellet electrode with a diameter of 10 mm.

Then, 100 mL of an aqueous KOH solution at 8 mol/L was injected into a cylindrical container made of a resin, and the pellet electrode and a mercury oxide reference electrode were disposed at a central part of the container and in the aqueous KOH solution. In addition, a nickel hydroxide counter electrode having sufficiently larger capacity than the negative electrode (pellet electrode) was disposed on an inner circumference part of the container to form a battery with regulated negative electrode capacity. On this battery, a charge-discharge test including a charge procedure of charging the battery at 0.5 It for 200 minutes and a discharge procedure of discharging the battery at 0.5 It until a negative electrode potential reached −0.3 V with respect to the mercury oxide reference electrode was performed to determine the electrochemical alloy capacity. In the charge and discharge procedures of the above pellet electrode, a negative electrode capacity was set to 1 It by calculation with postulating the alloy capacity as 300 mAh/g.

Into 100 parts by weight of the obtained hydrogen-storage alloy powder, 0.2 parts by weight of sodium polyacrylate powder, 0.04 parts by weight of carboxymethyl cellulose powder, 1.0 part by weight of styrene-butadiene rubber dispersion, 0.3 parts by weight of carbon black powder, and 22.4 parts by weight of water were added, and the mixture was kneaded under an environment at 25° C. to prepare a negative electrode mixture paste.

This negative electrode mixture paste was added into a nickel foam sheet with a surface density (basis amount) of approximately 300 $g/m^2$ and a thickness of approximately 1.7 mm. Then, the negative electrode mixture paste was dried to obtain a nickel foam sheet filled with the negative electrode mixture. The obtained sheet was rolled for increasing an amount of alloy per unit volume, and then cut to 40 mm in length and 40 mm in width to obtain a negative electrode 12. A thickness of the negative electrode 12 was 0.75 mm. A negative electrode capacity calculated by the above electrochemical alloy capacity was 2500 mAh.

Next, the obtained negative electrode 12 was subjected to an activating treatment. A procedure of this activating treatment will be described below.

First, a common sintering-type nickel hydroxide positive electrode was prepared. Prepared for this nickel hydroxide positive electrode was a positive electrode having a sufficiently larger positive electrode capacity than the negative electrode capacity of the negative electrode 12. Then, this nickel hydroxide positive electrode and the obtained negative electrode 12 were stacked in a state where a separator formed with a polyethylene non-woven fabric was interposed therebetween to form an electrode group for the activating treatment. This electrode group for the activating treatment was housed in a container made from an acrylic resin together with a predetermined amount of an alkaline electrolyte liquid to form a single electrode cell of a nickel-hydrogen secondary battery with regulated negative electrode capacity.

Under an environment at a temperature of 25° C., this single electrode cell was left to stand for 5 hours, then charged at 0.5 It for 2.8 hours, and thereafter discharged at 0.5 It until a battery voltage reached 0.70 V. This charge-discharge cycle was repeated 5 times to perform the activating treatment of the negative electrode 12.

Then, the single electrode cell was charged at 0.5 It for 2.8 hours, and then the negative electrode 12 was taken from the single electrode cell. This procedure yielded an activating-treated and charged negative electrode 12.

(4) Manufacture of Air-Hydrogen Secondary Battery

The obtained air electrode 16 and negative electrode 12 were stacked with a separator 14 interposed therebetween to manufacture an electrode group 10. The separator 14 used for manufacturing this electrode group 10 was formed with a non-woven fabric made of a polypropylene fabric having a sulfone group, and a thickness thereof was 0.2 mm (basis amount of 100 g/m$^2$).

Next, a container body 6 was prepared, and the above electrode group 10 was housed in this container body 6. In this time, a nickel foam sheet as the adjuster 36 was disposed on the bottom wall 18 of the container body 6, and the electrode group 10 was mounted on this adjuster 36. The nickel foam sheet had a square shape with 1 mm in thickness, 40 mm in length, and 40 mm in width.

Next, the water-repellent ventilation member 40 was disposed on the electrode group 10 (on the air electrode 16). The water-repellent ventilation member 40 was formed by combining a PTFE porous film 42 with 45 mm in length, 45 mm in width, and 0.1 mm in thickness, and a non-woven fabric diffusing paper 44 with 40 mm in length, 40 mm in width, and 0.2 mm in thickness.

Next, an opening part 22 of the container body 6 was covered with a lid 8. In this time, the entire area including the ventilation duct 30, inlet ventilation hole 32, and outlet ventilation hole 34 on the inner face part 28 of the lid 8; and the water-repellent ventilation member 40 were tightly attached so that the area was covered with the water-repellent ventilation member 40. The ventilation duct 30 had one serpentine shape as an entirety. A transverse cross section of the ventilation duct 30 was rectangular with 1 mm in length and 1 mm in width. This ventilation duct 30 was opened on the water-repellent ventilation member 40 side.

With the container 4 formed by combining the container body 6 and the lid 8, the periphery edge parts 46 and 48 were sandwiched from upper and lower sides with couplers 50 and 52. At a contacting part between the container body 6 and the lid 8, a packing made of a resin, not illustrated, was disposed to prevent a leakage of the alkaline electrolyte liquid.

Next, a 5 mol/L aqueous KOH solution as the alkaline electrolyte liquid 82 was injected into the electrolyte liquid storage part 80. An amount of the injected aqueous KOH solution in this time was 50 mL.

The battery 2 illustrated in FIG. 1 was manufactured by the above procedure.

An air electrode lead 54 was electrically connected to the air electrode 16, and a negative electrode lead 56 was electrically connected to the negative electrode 12. These air electrode lead 54 and negative electrode lead 56 appropriately extended through draw-out apertures 24 and 26, which were for the leads, to the outside of container 4 with keeping the gas tightness and liquid tightness of the container 4. The air electrode terminal 58 was attached to a tip of the air electrode lead 54, and the negative electrode terminal 60 was attached to a tip of the negative electrode lead 56.

Example 2

An air-hydrogen secondary battery was manufactured in the same manner as in Example 1 except that each of Bi(NO$_3$)$_3$·5H$_2$O and RuCl$_3$·3H$_2$O was weighed so that a content of Bi was 15.3 atom %, a content of Ru was 19.0 atom %, and Bi was 0.806 at an atomic ratio based on 1.000 of Ru.

Example 3

An air-hydrogen secondary battery was manufactured in the same manner as in Example 1 except that each of Bi(NO$_3$)$_3$·5H$_2$O and RuCl$_3$·3H$_2$O was weighed so that a content of Bi was 15.6 atom %, a content of Ru was 19.4 atom %, and Bi was 0.806 at an atomic ratio based on 1.000 of Ru.

Example 4

An air-hydrogen secondary battery was manufactured in the same manner as in Example 1 except that each of Bi(NO$_3$)$_3$·5H$_2$O and RuCl$_3$·3H$_2$O was weighed so that a content of Bi was 15.6 atom %, a content of Ru was 19.4 atom %, and Bi was 0.805 at an atomic ratio based on 1.000 of Ru.

Example 5

An air-hydrogen secondary battery was manufactured in the same manner as in Example 1 except that each of Bi(NO$_3$)$_3$·5H$_2$O and RuCl$_3$·3H$_2$O was weighed so that a content of Bi was 13.7 atom %, a content of Ru was 17.0 atom %, and Bi was 0.802 at an atomic ratio based on 1.000 of Ru.

Example 6

An air-hydrogen secondary battery was manufactured in the same manner as in Example 1 except that each of Bi(NO$_3$)$_3$·5H$_2$O and RuCl$_3$·3H$_2$O was weighed so that a content of Bi was 15.4 atom %, a content of Ru was 19.8 atom %, and Bi was 0.780 at an atomic ratio based on 1.000 of Ru.

Example 7

An air-hydrogen secondary battery was manufactured in the same manner as in Example 1 except that each of Bi(NO$_3$)$_3$·5H$_2$O and RuCl$_3$·3H$_2$O was weighed so that a content of Bi was 16.2 atom %, a content of Ru was 20.2 atom %, and Bi was 0.801 at an atomic ratio based on 1.000 of Ru.

Comparative Example 1

An air-hydrogen secondary battery was manufactured in the same manner as in Example 1 except that: each of Bi(NO$_3$)$_3$·5H$_2$O and RuCl$_3$·3H$_2$O was weighed so that a content of Bi was 16.4 atom %, a content of Ru was 19.1 atom %, and Bi was 0.861 at an atomic ratio based on 1.000 of Ru; and the calcining temperature in the calcining step was set to 600° C.

Comparative Example 2

An air-hydrogen secondary battery was manufactured in the same manner as in Example 1 except that: each of $Bi(NO_3)_3 \cdot 5H_2O$ and $RuCl_3 \cdot 3H_2O$ was weighed so that a content of Bi was 19.2 atom %, a content of Ru was 21.6 atom %, and Bi was 0.890 at an atomic ratio based on 1.000 of Ru; and the temperature of the aqueous nitric acid solution was set to 60° C., and the concentration of the aqueous nitric acid solution was set to 5 mol/L in the acid-treating step.

Comparative Example 3

An air-hydrogen secondary battery was manufactured in the same manner as in Example 1 except that: each of $Bi(NO_3)_3 \cdot 5H_2O$ and $RuCl_3 \cdot 3H_2O$ was weighed so that a content of Bi was 15.9 atom %, a content of Ru was 18.1 atom %, and Bi was 0.879 at an atomic ratio based on 1.000 of Ru; and the calcining temperature in the calcining step was set to 600° C.

Comparative Example 4

An air-hydrogen secondary battery was manufactured in the same manner as in Example 1 except that: each of $Bi(NO_3)_3 \cdot 5H_2O$ and $RuCl_3 \cdot 3H_2O$ was weighed so that a content of Bi was 17.5 atom %, a content of Ru was 20.1 atom %, and Bi was 0.867 at an atomic ratio based on 1.000 of Ru; and the calcining temperature in the calcining step was set to 600° C.

Summarized in Table 1 are the calcining temperature and the conditions in the acid-treating step (condition of the nitric-acid treatment) in the synthesis of the catalyst for the air electrode of the above Examples 1 to 7 and Comparative Examples 1 to 4.

TABLE 1

|  | Calcining temperature [° C.] | Condition of nitric acid treatment | |
|---|---|---|---|
|  |  | Concentration of aqueous nitric acid solution [mol/L] | Temperature of aqueous nitric acid solution [° C.] |
| Example 1 | 500 | 2 | 25 |
| Example 2 | 500 | 2 | 25 |
| Example 3 | 500 | 2 | 25 |
| Example 4 | 500 | 2 | 25 |
| Example 5 | 500 | 2 | 25 |
| Example 6 | 500 | 2 | 25 |
| Example 7 | 500 | 2 | 25 |
| Comparative Example 1 | 600 | 2 | 25 |
| Comparative Example 2 | 500 | 5 | 60 |
| Comparative Example 3 | 600 | 2 | 25 |
| Comparative Example 4 | 600 | 2 | 25 |

2. Analysis of Catalysts for Air Electrode

Samples for analysis of the powders of the catalysts for the air electrode obtained in Examples 1 to 7 and Comparative Examples 1 to 4 were analyzed by an X-ray diffraction method (XRD). For the XRD analysis, a parallel-beam X-ray diffraction analyzer was used. The analysis conditions were as follows: an X-ray source was CuKα; a tube voltage was 15 kV; a tube current was 15 mA; a scanning speed was 1°/min; a step width was 0.01°. As a result of the analysis, the catalysts for the air electrodes were confirmed, based on obtained diffraction chart patterns, to be $Bi_{2-x}Ru_2O_{7-z}$ (x satisfies a relationship of 0≤x≤1 and z satisfies a relationship of 0≤z≤1) having a pyrochlore crystalline structure and a similar crystalline structure.

In addition, samples for analysis of the powders of the catalysts for the air electrode obtained in Examples 1 to 7 and Comparative Examples 1 to 4 were subjected to SEM/EDS analysis, which observed a secondary electron image with a scanning electron microscope (SEM) and performed elemental analysis by energy X-ray dispersive spectrometry (EDS). A scanning electron microscope (JSM-6510) and an energy dispersive X-ray analyzer (JED-2300), which were manufactured by JEOL Ltd., were used as analyzers for the SEM/EDS analysis.

First, as a result of observing the secondary electron image with a scanning electron microscope, the particle size of the bismuth ruthenium composite oxide was 0.1 μm or less.

Next, the elemental analysis was performed. The elemental analysis includes analyzing an elemental composition on a particle surface and analyzing an elemental composition inside a particle, that is in a bulk. For the elemental composition analysis on a particle surface, Rutherford backscattering spectrometer (RBS), which can directly measure a distribution of an elemental composition in the depth direction near the surface (within approximately 1 μm or less from the outermost surface), is an effective method. However, Na, which is a main analysis target in the present application, is likely to vary a value of the atom % on the particle surface depending on a degree of catalyst washing. Thus, the analysis on the particle surface with RBS was not performed, and the elemental analysis of the bulk was performed.

A specific procedure of the analysis was as follows. First, each powder of the catalyst for the air electrode, which was the sample for analysis of Examples 1 to 7 and Comparative Examples 1 to 4, was embedded in a resin to cure the resin. The cured resin was cut across a predetermined position to expose a cross section (bulk part) of the catalyst particle for the air electrode. Then, the cross-sectional surface of the resin including the exposed cross section of the catalyst particle for the air electrode was buffing-polished. Thereafter, the polished cross section of the catalyst particle for the air electrode was irradiated with electron beam by the energy dispersive X-ray analyzer, and a characteristic X-ray generated in this time was dispersed to perform the quantitative analysis of Bi, Ru, O, and Na. Specifically, the quantitative analyses were performed in a first field and in a second field other than the first field under the conditions that the acceleration voltage was 15 keV, the measurement magnification was 2000 times, and the number of integrations was 50 times. Then, contents of Bi, Ru, O, and Na were determined with an average value of an analysis result in the first field and an analysis result in the second field. Table 2 shows this result. In addition, based on the obtained contents of Bi, Ru, O, and Na, Na/(Ru+Bi+Na) and Bi/Ru were determined. Na/(Ru+Bi+Na) representing an atomic ratio of Na to the sum of the Bi, Ru, and Na, and Bi/Ru representing an atomic ratio of Bi to Ru. Table 2 also shows these results.

3. Evaluation of Battery Characteristics

The air-hydrogen secondary batteries of Examples 1 to 7 and Comparative Examples 1 to 4 were, under an atmosphere at 25° C., charged at 0.1 It for 10 hours with the air electrode terminal 58 and the negative electrode terminal 60, discharged at 0.2 It until a battery voltage reached 0.4 V, and this charge-discharge cycle was repeated. It is to be noted that, in the above charge and discharge processes of the air-hydrogen secondary battery, 2.0 Ah, which corresponded to 80% of the negative electrode capacity, was set to 1.0 It.

In the above charge and discharge processes, each interval of 10 minutes was provided between the charge and the discharge, and between the discharge and the charge.

Table 2 shows a discharge intermediate voltage, which is an intermediate voltage during the discharge in the third cycle of the above charge-discharge cycle.

In the above charge and discharge processes, regardless of the charge and the discharge, air was continuously fed into the ventilation duct 30 at a rate of 33 mL/min by feeding air through the inlet ventilation hole 32 and emitting the air through the outlet ventilation hole 34. As the air fed to the ventilation duct 30, air bubbling-passed through an aqueous KOH solution (with a $CO_2$ concentration of approximately 100 ppm) was used.

TABLE 2

| | Content [atom %] | | | | Na/(Bi + Ru + Na) | Bi/Ru | Discharge intermediate voltage [V] |
|---|---|---|---|---|---|---|---|
| | Bi | Ru | O | Na | | | |
| Example 1 | 14.18 | 17.39 | 63.09 | 5.34 | 0.145 | 0.815 | 0.750 |
| Example 2 | 15.31 | 18.99 | 60.36 | 5.34 | 0.135 | 0.806 | 0.741 |
| Example 3 | 15.65 | 19.42 | 59.89 | 5.04 | 0.126 | 0.806 | 0.740 |
| Example 4 | 15.60 | 19.39 | 59.60 | 5.41 | 0.134 | 0.805 | 0.737 |
| Example 5 | 13.67 | 17.05 | 64.79 | 4.49 | 0.128 | 0.802 | 0.731 |
| Example 6 | 15.44 | 19.79 | 59.68 | 5.09 | 0.126 | 0.780 | 0.728 |
| Example 7 | 16.17 | 20.18 | 58.10 | 5.54 | 0.132 | 0.801 | 0.726 |
| Comparative Example 1 | 16.42 | 19.07 | 60.23 | 4.28 | 0.108 | 0.861 | 0.717 |
| Comparative Example 2 | 19.22 | 21.60 | 54.24 | 4.93 | 0.108 | 0.890 | 0.712 |
| Comparative Example 3 | 15.91 | 18.11 | 61.99 | 4.00 | 0.105 | 0.879 | 0.703 |
| Comparative Example 4 | 17.46 | 20.13 | 58.12 | 4.28 | 0.102 | 0.867 | 0.689 |

4. Consideration

Table 2 shows that discharge intermediate voltages of the batteries of Example 1 to 7 are 0.726 V to 0.750 V, whereas the discharge intermediate voltages of the batteries of Comparative Examples 1 to 4 are 0.689 V to 0.717 V. The batteries of Examples 1 to 7 are found to have higher discharge voltages than the batteries of Comparative Examples 1 to 4 and have improved discharge characteristics. The batteries of Examples 1 to 7 have values of Na/(Bi+Ru+Na) of 0.126 to 0.145, whereas the batteries of Comparative Examples 1 to 4 have values of Na/(Bi+Ru+Na) of 0.102 to 0.108. That is, the batteries of Examples 1 to 7 include the catalysts for the air electrode having more Na to the total of Bi, Ru, and Na than the batteries of Comparative Examples 1 to 4. Accordingly, it can be said that a larger ratio of the Na amount in the catalyst for the air electrode can increase the discharge voltage.

In the manufacture of the catalysts in Examples 1 to 7, the sodium amount in the bulk of the bismuth-ruthenium composite oxide is increased by regulating the composition ratio of the mixed aqueous solution of bismuth and ruthenium and by adjusting the calcining condition and the acid-treating condition. This increased sodium amount substitutes a part of bismuth in the pyrochlore crystalline stricture with sodium. Such a substitution with sodium shifts the crystalline structure of the bismuth-ruthenium composite oxide from the general $Bi_2Ru_2O_7$. As a result, oxygen in the crystal lattice is allowed to easily move, and the catalytic activity involving the move of oxygen in the crystal lattice is presumed to be improved to increase the discharge voltage. It is also presumed that containing sodium in the bulk of the bismuth-ruthenium composite oxide contributes to increase in the conductivity.

<Aspects of the Present Invention>

A first aspect of the present invention is a catalyst for an air electrode, comprising an oxide containing at least bismuth, ruthenium, sodium, and oxygen, wherein Na/(Ru+Bi+Na) representing an atomic ratio of the sodium to a sum of the bismuth, the ruthenium, and the sodium is 0.126 or more and 0.145 or less.

In this first aspect, a larger content ratio of Na in the bismuth-ruthenium composite oxide substitutes a part of bismuth in the pyrochlore crystalline structure with sodium to improve the catalytic activity, which can contribute to increase in the discharge voltage of the battery.

A second aspect of the present invention relates to the catalyst for an air electrode according to the above first aspect of the present invention, wherein Bi/Ru representing an atomic ratio of the bismuth to the ruthenium is 0.780 or more and 0.815 or less.

This second aspect further improves the catalytic activity of the bismuth-ruthenium composite oxide.

A third aspect of the present invention relates to an air electrode, comprising: a substrate for an air electrode; and an air electrode mixture supported on the substrate for an air electrode, wherein the air electrode mixture includes the catalyst for an air electrode according to the above first or second aspect.

This third aspect can yield the air electrode contributing to improvement in the discharge characteristics of the battery comparing with conventional air electrodes.

A fourth aspect of the present invention is an air secondary battery, comprising: a container; an electrode group disposed in the container; and an alkaline electrolyte liquid injected into the container, wherein the electrode group includes an air electrode and a negative electrode that are stacked with a separator interposed therebetween, and the air electrode includes the air electrode according to the above third aspect.

This fourth aspect can yield the air secondary battery in which the discharge characteristics are improved comparing with conventional air secondary batteries.

A fifth aspect of the present invention is the air secondary battery according to the above fourth aspect, wherein the negative electrode includes a hydrogen-storage alloy.

This fifth aspect can yield the air-hydrogen secondary battery having excellent discharge characteristics.

The present invention is not limited to the above embodiments and Examples. For examples, the present invention is not limited to the air-hydrogen secondary battery, and may be other air secondary batteries using Zn, Al, Mg, Li or the like as the metal used for the negative electrode. In these other air secondary batteries, a reaction in the air electrode is similar to that in the air-hydrogen secondary battery of the present embodiment, and the improving effect of the discharge voltage of the battery can be similarly obtained.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A catalyst for an air electrode, comprising an oxide containing at least bismuth (Bi), ruthenium (Ru), sodium (Na), and oxygen, wherein Na/(Ru+Bi+Na) representing an atomic ratio of the sodium to a sum of the bismuth, the ruthenium, and the sodium is 0.126 or more and 0.145 or less, and wherein Bi/Ru representing an atomic ratio of the bismuth to the ruthenium is 0.780 or more and 0.815 or less.

2. An air electrode, comprising:
a substrate for an air electrode; and
an air electrode mixture supported on the substrate for an air electrode,
wherein the air electrode mixture includes the catalyst for an air electrode according to claim 1.

3. An air secondary battery, comprising:
a container;
an electrode group disposed in the container; and
an alkaline electrolyte liquid injected into the container, wherein:
    the electrode group includes an air electrode and a negative electrode that are stacked with a separator interposed therebetween, and
    the air electrode is the air electrode according to claim 2.

4. The air secondary battery according to claim 3, wherein:
the negative electrode includes a hydrogen-storage alloy.

* * * * *